July 17, 1923.
W. G. FULLER
SEAT BACK
Filed April 3, 1922
1,461,772
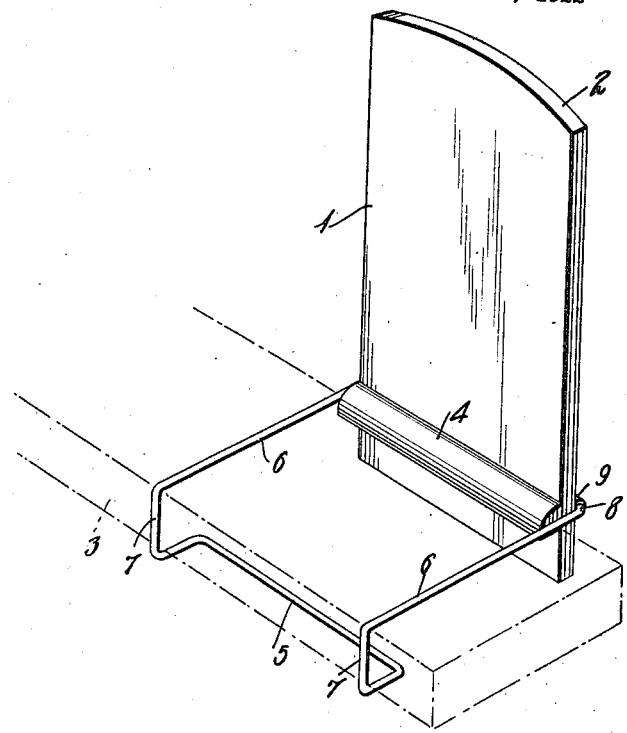
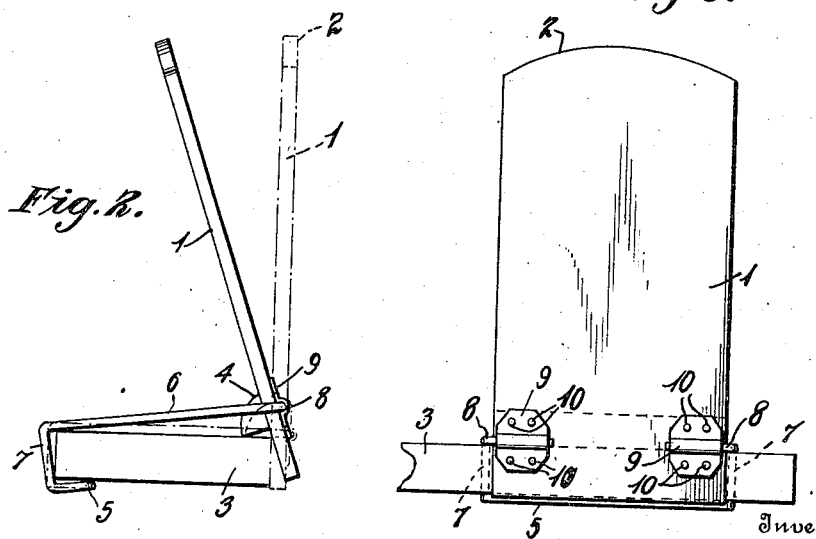
Inventor
Wellington G. Fuller
By Milton Buck
Attorney Patented July 17, 1923.

1,461,772

UNITED STATES PATENT OFFICE.

WELLINGTON G. FULLER, OF ABERDEEN, SOUTH DAKOTA, ASSIGNOR OF ONE-HALF TO STUART C. SEARLE, OF ABERDEEN, SOUTH DAKOTA.

SEAT BACK.

Application filed April 3, 1922. Serial No. 549,047.

*To all whom it may concern:*

Be it known that I, WELLINGTON G. FULLER, a citizen of the United States, residing at Aberdeen, in the county of Brown and State of South Dakota, have invented certain new and useful Improvements in a Seat Back, of which the following is a specification.

This invention has relation to certain new and useful improvements in a seat back and has for its primary object the provision of a seat back especially adapted for use in connection with a flat seat such as provided by a plank positioned on suitable supporting means.

The invention has for another object the provision of a seat back of the character stated which will be of extremely simple construction and composed of the minimum number of parts and which may be readily clamped in position or moved if desired.

The invention has for a further object the provision of a seat back of the character set forth which will be constructed in such a manner as to clamp upon opposite side edges of the seat member when in use, the pressure of the weight of the body leaning against the back serving to tighten the back on the seat and retain the back in an upright position.

The invention has for a still further object the provision of a seat back of the character set forth in which the parts will be constructed and arranged so that practically the entire face of the back proper may be employed for advertising purposes without in any way affecting the back or the use of the same upon the seat.

The invention has for a still further object the provision of a seat back of the character set forth in which the clamping means for the back proper may be readily folded against the back proper and the device transported or stored away in the minimum space.

With the foregoing and other objects in view as will appear as the description proceeds, the invention consists of the novelty construction, combination and arrangement of co-operating elements as hereinafter more specifically set forth, claimed and shown in the accompanying drawing forming a part of the present application and in which:

Fig. 1 is a perspective view of the seat back in position for use, a plank seat being indicated by dotted lines.

Fig. 2 is a side elevation showing the normal position of the seat back as applied to the seat and indicating by dotted lines the upright position of the back proper when in use.

Fig. 3 is a rear elevation of the seat back in position for use with the back proper in upright position.

Referring more in detail to the drawings in which similar reference characters designate corresponding parts throughout the several views, 1 indicates the back proper which is shown as being in the form of a solid board and may be composed of wood or any other suitable material. The back proper 1 is of rectangular form and the upper edge 2 may be curved as shown or finished in any other suitable manner.

The back 1 is adapted for engagement on one longitudinal side edge of a flat seat 3 such as formed by a plank positioned on suitable supporting means, not shown. A transverse strip or stop member 4 is provided on the front face of the back proper 1 near the lower end thereof and this strip or stop member 4 is adapted to rest upon the upper face of the seat 3 when the back is secured thereon and the back proper 1 in upright position, as indicated by dotted lines in Fig. 2 and by full lines in Figures 1 and 3. This stop member 4 serves to limit downward movement of the back proper 1, as will be clearly understood.

In order to securely clamp the back proper 1 in its upright position, a substantially U-shaped spring clamping member 5 is employed. The central part of this member is opposite from the legs 6 of the U-shaped member and turned back to engage under the seat 3, as shown clearly in Fig. 1, while the legs 6 extend transversely over the upper face of the seat 3 and in parallel relation. The forward ends of the legs 6 connect with the central part of the U-shaped member 5 by the downwardly bent forward end portion 7 of the legs 6, while the free rear ends 8 of the legs 6 are turned at right-angles and extend toward one another. These free ends 8 of the legs 6 are received in the stationary hinge plates 9 secured on the rear face of the back proper 1, near the lower end thereof, by suitable securing members 10. As shown the wire member 5 is bent to form a recurved securing lip adapted to engage with the forward edge of the seat 3, the leg portions 6 extending in parallel spaced edge relation.

This seat back is especially adapted for advertising purposes and for use where seats known as circus seats or temporary grandstand seats are employed as the back may be readily placed in position or removed and when not in use may rest upon the seat and will naturally fold over upon the latter thereby making it possible for parties to pass readily between the rows of seats or if necessary to pass over the seats without interference of the seat backs. It will also be evident by referring to Fig. 2 that the legs 6 of the spring clamping member should be of such length and extended at the proper angle with respect to the turned back central portion of the spring clamping member 5 as to tend to draw the back proper 1 forwardly to the tilted position shown in this figure. This will result in a tightening or clamping of the back proper 1 in upright position when the seat is occupied and the party occupying the same leans against the back proper 1 thereby forcing the back proper 1 back into the vertical or upright position shown by dotted lines in this view. This also results in forcing the stop member 4 into proper engagement with the upper face of the seat 3 along the rear edge thereof, with the legs 6 of the U-shaped clamping member binding upon the upper face of the seat 3. It is therefore evident that with the parts in this position, the back proper 1 will serve as a firm support for the back of the party seated in front of and leaning against the same. It is also evident that practically the entire face of either the front or back of the back proper 1 may be employed for advertising purposes, if desired.

While the preferred embodiment of the invention has been shown and described, it is to be understood that minor changes in the details of construction and arrangement of parts may be resorted to within the scope of what is claimed without departing from the spirit of the invention.

What is claimed is:

1. A readily detachable seat back comprising a substantially U-shaped seat engaging member, the parallel legs of which, when in operative position, are adapted to engage the upper surface of a seat member, said legs being provided with angularly disposed portions adapted to intimately engage the front edge of the seat member, said angularly disposed portions being connected by a horizontally disposed member adapted to intimately engage the under surface of the seat member; a back member pivotally secured to the free ends of said legs, a portion of said back member projecting below the pivot point and adapted to intimately engage the rear edge of said seat member, and to thereby prevent the backward tilting of said back member; and independent means comprising a cleat provided with a relatively broad flat bottom surface carried by said back member adjacent its lower end in cooperative relation to said seat member adapted to normally prevent forward tilting of said back member.

2. A readily detachable seat back comprising a substantially U-shaped resilient wire seat engaging member, the parallel legs of which, when in operative position, are adapted to engage the upper surface of a seat member, said legs being provided with angularly disposed portions adapted to intimately engage the front edge of the seat member, said angularly disposed portions being connected by a horizontally disposed member adapted to intimately engage the under surface of the seat member; a back member pivotally secured to the free ends of said legs, a portion of said back member projecting below the pivot point and adapted to intimately engage the rear edge of said seat member, and to thereby prevent the backward tilting of said back member; and independent means comprising a cleat carried by said back member adapted to engage the upper surface of said seat member adjacent its rear edge and to normally prevent forward tilting of said back member.

In testimony whereof, I, affix my signature.

WELLINGTON G. FULLER.